United States Patent Office 3,825,532
Patented July 23, 1974

3,825,532
PROCESS FOR THE PREPARATION OF
OMEGA LAURINOLACTAME
Rene Kern, Savigny-sur-Orge, Claude Poulain, Orsay, and Francois Tock, Palaiseau, France, assignors to Societe Anonyme dite: Aquitaine Total Organico, Courbevoie, France
No Drawing. Filed Oct. 26, 1971, Ser. No. 192,327
Claims priority, application France, Oct. 28, 1970, 7038817
Int. Cl. C07d 41/00
U.S. Cl. 260—239.3 A
4 Claims

ABSTRACT OF THE DISCLOSURE

A process for rearranging cyclododecanoneoxime into pure cyclododecalactame, characterized by the fact that the oxime, converted into oxime chlorhydrate, is made into a solution with a selective solvent, in the presence of a small quantity of catalyst, chosen from the group of acid halides and oxyhalides, and then heated to a temperature of between 65 and 110° C. for one to two hours, the resulting hydrochloric acid is drawn off by means of a flow of gas while maintaining the reflux temperature of the solvent, the reaction mixture is washed while hot with an alkaline aqueous solution, the organic phase containing the lactame is washed in hot water until it becomes neutral, and the lactame is recovered by crystallization or distillation of the solvent.

The quantity of catalyst used ranges from 0.5 to 5%, and preferably 1 to 2%, of the weight of oxime.

The solvent is preferably selected from alkanes, cycloalkanes, substituted alkane and cycloalkane derivatives, and halogenated alkane and cycloalkane derivatives.

---

This invention concerns a new process for the preparation of omega laurinolactame, involving Beckmann's rearrangement and producing an extremely pure substance, with a yield of more than 92%.

Methods already exist for preparing omega lactames by isomerizing the corresponding oximes through the effect of strong inorganic acids such as sulphuric acid, oleum, hydrochloric acid and phosphoric acid, and certain acid chlorides such as thionyl chloride, in a sulphur dioxide medium.

Rearrangement in a sulphuric medium is the most effective of all such methods, and is the most widely used on an industrial scale. However, the substance obtained requires the most careful purifying treatments, and isolation of the lactame and treatment of the residual sulphuric effluents are operations that place a considerable burden on the profitability of the process.

A proposal has also been made to rearrange cyclo-aliphatic oxime chlorhydrates dissolved in an organic solvent into the corresponding lactames, using sulphuric acid (A. Striegler, Journal für praktische Chemie, 4th series, volume 15, numbers 1 and 2 (1962)). Although the presence of a solvent reduces the harmful effect on the purity of the lactame of the exothermic character of the rearrangement, resinification of the product has been found to occur, and the sulphuric acid still needs to be recovered.

According to the present invention, oxime cyclododecanone chlorhydrate is rearranged by heating to a temperature of 65 to 110° C., a solution of oxime cyclododecanone chlorhydrate in a selective solvent, in the presence of a very small quantity of catalyst, chosen from the group of acid chlorides and oxychlorides.

The rearrangement reaction according to the invention takes place under very moderate conditions, produces a pure lactame, and does not involve any complicated acid-recycling operations. The hydrochloric acid from the chlorhydrate can be recovered by being drawn off by means of a flow of gas at a temperature of at least 50° C. The catalyst can be removed simply by washing with water.

Solvents that may be used in the reaction according to the present invention include those with a boiling point between 65 and 110° C., preferably belonging to the group of alkanes, cycloalkanes, and their substituted or halogenated derivatives. Aromatic hydrocarbons can also be used, but conversion is slower. The solvents employed include all chlorinated methane derivatives, particularly carbon tetrachloride, heptane, cyclohexane, methylcyclohexane. The proportions of solvent used should be such that the oxime chlorhydrate is completely dissolved at the boiling point of the solvent.

The rearrangement catalysts are selected from the group of acid chlorides and oxychlorides derived from phosphorus and sulphur, such as phosphorus trichloride, phosphorus pentachloride, phosphorus oxychloride, thionyl chloride, sulphuryl chloride and benzene sulphochloride.

The amount of catalyst needed for the reaction is very small, about 0.5 to 5% of the weight of oxime, and preferably 1 to 2%. It has been found that the rearrangement reaction according to the invention can be performed using the oxime itself, but the yield is much higher if chlorhydrate is used, and so the oxime is converted into oxime chlorhydrate containing approximately 15% hydrogen chloride.

The temperature of rearrangement is the reflux temperature of the solvent, varying from 65 to 110° C., whereas the temperature of rearrangement in sulphuric acid, with a concentration of 80 to 100%, is approximately 100 to 175° C. The solvent moderates the exothermic nature of the rearrangement reaction, so that there is no degradation of the lactame, which can be polymerized after simply being washed while hot, using water or an alkaline aqueous solution, and possibly recrystallized.

The following examples illustrate various embodiments of the present invention, without its being confined to them.

Example 1

The following ingredients are mixed in a 500 ml. Pyrex round-bottom flask, equipped with a reflux cooler, a gas inlet, an outlet to draw off the hydrochloric acid, and a stirring device:

46.7 g. (0.2 moles) of oxime cyclododecanone chlorhydrate containing 15.63% hydrochloric acid;
100 g. of pure carbon tetrachloride;
0.4 g. of thionyl chloride, i.e. 1% of the weight of oxime.

The mixture is heterogeneous at atmospheric temperature, and forms a suspension when stirred.

It is then heated gently, and is found to form a homogeneous solution at 45° C. It is heated to 76° C., the reflux temperature of the solvent, and kept at this temperature for an hour.

Hydrochloric acid is given off, and the solution remains limpid. The remaining traces of hydrochloric acid can be drawn off by means of a gas such as air, $CO_2$ or $N_2$, keeping the temperature at 76° C.

The reactive lactame solution is washed while hot with an 8% sodium hydroxide solution. The aqueous soda phase is decanted off, and the organic phase containing the lactame is neutralized by repeated washing in hot water. The lactame is allowed to crystallize in the solvent, and is isolated by filtration.

36.6 g. of pure lactame, with a melting point of 153° C., are obtained—a yield of 95.4%.

Example 2

The rearrangement and various washing operations are performed as in example 1, and after decanting of the washing water, the lactame is isolated by distillation of the solvent.

The crude lactame obtained is recrystallized in 150 cc. of cyclohexane.

38.5 g. of lactame, with a melting point of 154° C., are obtained—a yield of 97.7%.

Example 3

Example 1 is repeated, except that the thionyl chloride is replaced as catalyst by 2% weight of phosphorus trichloride, in relation to the weight of oxime.

The mixture is heated for 2 hours, at the reflux temperature of the $CCl_4$. A yield of 94% of pure lactame, with a melting point of 153° C., and conversion rate of 100%, is obtained.

Example 4

Example 1 is repeated, except that the catalyst is replaced by 1% weight of phosphorus oxychloride, and the solvent by cyclohexane. It is heated to 81° C. for 2 hours. A yield of 97% of pure lactame with a melting point of 154° C., and conversion rate of 100%, is obtained.

Example 5

Example 1 is repeated, using 1% weight of phosphorus pentachloride as catalyst, and heptane as solvent. After heating to 98° C. for 2 hours, a yield of 95% pure lactame, with a melting point of 153° C., and a conversion rate of 100%, is obtained.

Example 6

Example 1 is repeated, using 2% weight of sulphuryl chloride as catalyst and chloroform as solvent. After reflux heating for 2 hours, a yield of 92% pure lactame, with a melting point of 153° C., and conversion rate of 100%, is obtained.

Example 7

Example 1 is repeated, using 2% benzene sulphochloride as catalyst and chloroform as solvent. It is reflux heated for 2 hours, and 36.5 g. of pure lactame, with a melting point of 154° C., are obtained—a yield of 94.5%. As with all the other examples, vapour-phase chromatography is used to check that no traces of oxime have been drawn in. Analysis confirms that the conversion rate is 100%.

Example 8

Example 1 is repeated, using 2% instead of 1% thionyl chloride, and using benzene as solvent.

The length of reflux heating time has to be extended to obtain a 100% conversion rate. It is only after 4 hours that results equivalent to those for example 1 are obtained, showing that rearrangement occurs more slowly in aromatic solvents.

What is claimed is:

1. A process for rearranging cyclododecaneoxime into cyclododecalactame comprising
   (a) heating to a temperature of 65° C. to 110° C. for one to 2 hours, a solution of oxime cyclododecanone chlorhydrate in a solvent system selected from the group consisting of alkanes, cycloalkanes, substituted and halogenated derivatives of said alkanes and cycloalkanes, in the presence of 0.5 to 5% based on the weight of said oxime of a catalyst selected from the group consisting of phosphorus trichloride, phosphorus pentachloride, phosphorus oxychloride, thionylchloride, sulphuryl chloride and benzene sulphochloride for a period of from 1 to 2 hours;
   (b) removing the resulting hydrochloric acid;
   (c) washing the reaction mixture with an alkaline aqueous solution;
   (d) washing the organic phase containing the desired lactame with hot water until neutralized; and
   (e) recovering the desired lactame product from said organic phase.
2. A process according to claim 1, wherein the catalyst is used in an amount ranging between 1 and 2% of the weight of said oxime.
3. A process according to claim 1 wherein the solvent used has a boiling point ranging between 65 and 110° C.
4. A process according to claim 1 wherein the solvent is selected from the group consisting of carbon tetrachloride, heptane, cyclohexane and methyl cyclohexane.

References Cited

UNITED STATES PATENTS

| | | | |
|---|---|---|---|
| 2,249,177 | 7/1941 | Schlack | 260—239.3 A |
| 2,883,377 | 4/1959 | Von Schickh et al. | 260—239.3 A |

OTHER REFERENCES

Chemical Abstracts, Vol. 51 (1957), Col. 4944, abstracting Tokura et al. Sci. Repts. Res. Insts., Tohoku Univ., Ser. A8, pp. 149–56 (1956).

HENRY R. JILES, Primary Examiner

R. T. BOND, Assistant Examiner